April 30, 1957  F. HERZEGH  2,790,476
SEALING MEANS FOR DIVIDED RIMS
Filed Jan. 12, 1954
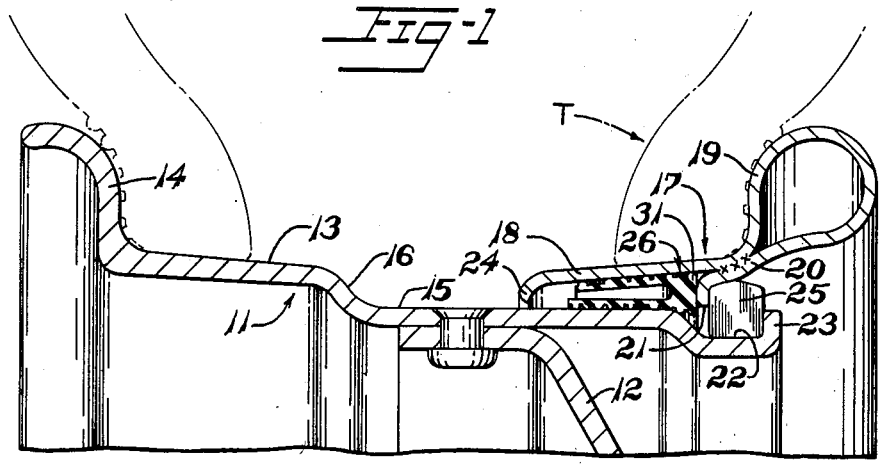
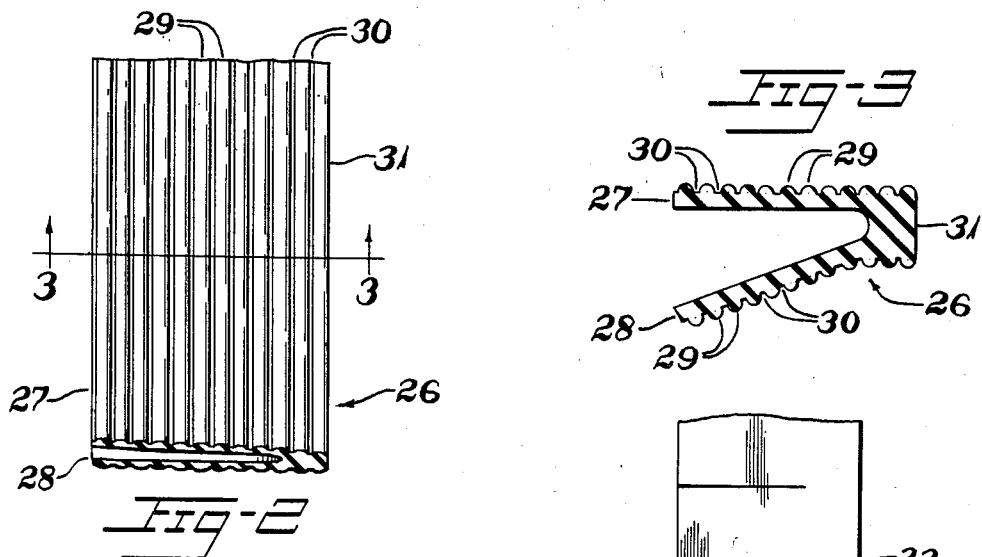
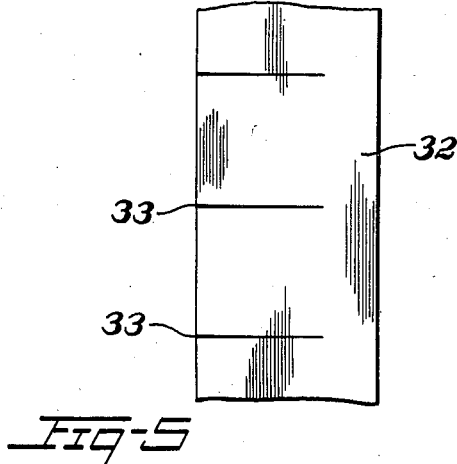
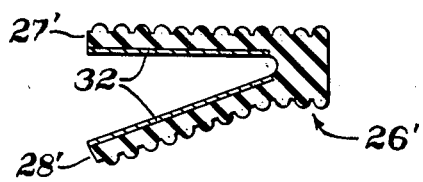
INVENTOR.
FRANK HERZEGH
BY
W. A. Shira, Jr.
ATTY.

United States Patent Office 2,790,476
Patented Apr. 30, 1957

2,790,476

SEALING MEANS FOR DIVIDED RIMS

Frank Herzegh, Cleveland, Ohio, assignor to The B. F. Goodrich Company, New York, N. Y., a corporation of New York Application January 12, 1954, Serial No. 403,549

9 Claims. (Cl. 152—410)

This invention relates to divided rims for vehicle tires and, more particularly, to a means for sealing such rims against fluid leakage so that they may be employed for mounting tubeless pneumatic tires.

Pneumatic tires employed upon trucks, buses and other heavy vehicles are massive and of relatively stiff construction so that it is customary to employ divided rim assemblies to facilitate mounting of the tires upon the vehicle wheels. Rims of this nature are circumferentially divided and one commonly employed type is composed of three basic parts; namely, a rim base section, a bead supporting ring member, and a ring retaining means. The rim base is fastened to the vehicle wheel and provides one tire bead support and retaining flange. The ring section is removable and is adapted to be positioned on the base section to provide a support and side flange for the other bead of the tire. The retaining means commonly comprises a split locking ring which is disposed between opposed surfaces of the rim and bead ring sections to prevent separation thereof. The bead supporting ring member or section is generally continuous and, hence, is assembled with the base section by passing the former over a portion of the latter. Consequently, the inner diameter of the bead ring section must be somewhat larger than the outside diameter of the rim section in the region in which the ring is positioned on the rim to facilitate mounting and demounting of the parts; the parts being maintained in assembled condition by the split locking ring which customarily fits between a shoulder of the ring and a gutter or shoulder of the rim base.

The above described rim construction is quite satisfactory when the vehicle tire mounted thereon utilizes a separate inner tube since it is not then necessary that the rim assembly be impervious to the passage of air. However, such rim assemblies, and others of the circumferentially separable type, are not suitable, without alterations, for mounting tubeless tires wherein the rim assembly must cooperate with the body of the tire to form a sealed air chamber. Consequently, although tubeless tires have many advantages over tires employing separate inner tubes the adoption of such tires for use on trucks and other large vehicles has been retarded because of the need for providing special mounting rims or expensive alterations in the existing rims.

The principal object of this invention is to provide a means for sealing circumferentially divided rim assemblies against leakage of fluid so that tubeless pneumatic tires may be employed thereon without the need of making extensive alterations in the assemblies.

Another object of the invention is to provide an improved divided rim assembly having a sealing means incorporated therein which sealing means can be applied either at the time of manufacture of the rim assembly or in the field after the rim has been in use.

A more specific object of the invention is to provide an improved circumferentially divided rim assembly for use with tubeless pneumatic tires wherein the space between the removable bead supporting ring and the rim base of the assembly is sealed by a resilient rubber member which may be readily applied to the assembly without the need of special tools or skill.

A still further object of the invention is to provide an improved rim assembly as defined in the preceding paragraph and wherein the sealing member is an annulus of resilient rubber substantially U-shaped in cross-section with the sides of the member extending axially and adapted to effect sealing engagement in the assembly by the action of the air pressure contained in a tubeless tire mounted on the assembly.

The invention also has as an object thereof, the provision of an improved sealing member for use with circumferentially divided rim assemblies which sealing member is an annulus of resilient rubber composition substantially U-shaped in cross-section with the sides thereof extending axially and provided on the outer surfaces thereof with circumferentially extending alternate ridges and grooves whereby the pressure of contact of the sealing member with the adjacent parts of the assembly is greater than the pressure of the fluid contained in a tubeless tire mounted on the assembly.

The invention further resides in certain novel features of the construction and arrangement of parts of the device in which the invention is embodied, and further objects and advantages thereof will be apparent to those skilled in the art to which the invention pertains from the following description taken in conjunction with the accompanying drawings, forming a part of the application, and in which:

Fig. 1 is a partial transverse section through the presently preferred embodiment of a rim assembly incorporating the invention, a portion of a tubeless tire being indicated by dot-dash lines to illustrate the assembled positions of the parts;

Fig. 2 is a fragmentary plan view of a portion of the sealing member of this invention, the view being to a larger scale than that of Fig. 1;

Fig. 3 is a transverse sectional view taken substantially on the section-indicating line 3—3 of Fig. 2;

Fig. 4 is a view similar to Fig. 3 but showing a modified form of the sealing member; and Fig. 5 is a detached plan view of a portion of the reinforcement provided in the sealing member illustrated in Fig. 4.

The rim assembly illustrated in Fig. 1 of the drawings comprises an annular rim base section or member 11 which is riveted or otherwise fastened to a conventional wheel disc or body 12. The rim base section or member 11 includes a circumferentially extending surface 13 which is adapted to receive and support one bead of a tire T, indicated in Fig. 1 by dot-dash lines. Along one edge of the surface 13 is an integral, generally radially extending flange portion 14 which prevents lateral displacement of the adjacent bead of the tire. The other edge of the surface 13 merges with a circumferentially extending surface 15 of lesser diameter, the surfaces 13 and 15 being connected by an offset portion 16.

The surface 15 is adapted to have a removable bead supporting ring member 17 sleeved thereover which member 17 provides the support for the other bead of the tire T. For this purpose, the ring member or section 17 has a continuous circumferentially extending surface 18 on which the bead of the tire is supported, the diameter of this surface being the same as that of the surface 13 on the rim base 11. The outer edge of the surface 18 on the member 17 merges with a radially extending flange portion 19 that cooperates with the tire to prevent lateral displacement thereof. In the illustrated construction, the flange portion 19 is formed by an integral curved portion of the member 17 which is reversely bent to provide a loop with the meeting portions thereof welded together as indicated at 20. The edge portion of the member 17, adjacent the loop thereof, is bent to extend substantially radially thereby providing an inwardly extending flange 21 which is adjacent a depressed portion or gutter 22 in the rim base. The outer side wall of the depressed portion or gutter 22 is formed by a radially outwardly extending integral flange 23 of the rim base and a retaining means is adapted to be disposed within the gutter 22 between the flanges 21 and 23.

The construction thus far described is conventional and is one type commonly employed to mount a truck tire or the like. In employing the assembly with a conventional tire and tube, these are positioned upon the rim base 11 with one bead of the tire resting upon the surface 13 and the other bead located above the surface 15. This bead of the tire is then forced towards the bead supported on the surface 13 and the removable ring member 17 is sleeved over the outer end portion of the surface 15, the inner end of the member 17 having an inwardly turned portion or protuberance 24 which cooperates with the surface 15 in locating the ring member. After the ring 17 is thus placed it is retained in position by a retaining or locking means in the form of a split resilient ring 25 which is disposed within the gutter 22 between the flanges 21 and 23. Upon inflation of the tube the bead of the tire adjacent the member 17 is forced outwardly thereover by the air pressure until the outer surface of this bead is firmly pressed against the flange portion 19.

In order to facilitate mounting and demounting tires, it is necessary that the removable ring member 17 have the diameter of the inner surface of its flange 24 sufficiently larger than the diameter of the surface 15 of the rim base 11 to permit sleeving of the member 17 upon the surface 15 without binding even though there may be some corrosion or roughness of the surface 15. This relatively loose fit of the parts has heretofore prevented the use of tubeless tires on such an assembly since the air or other fluid within the tire would freely pass outwardly through the surface between the rim section or member 11 and the ring member 17. In accordance with this invention, this opening is closed and the rim assembly rendered fluid tight by a sealing means which is disposed in the annular space provided between the inner surface of portion 18 of the ring member 17 and the surface 15 of the rim base or section 11. In the preferred embodiment, this sealing means comprises an annular member 26 of resilient rubber composition which is preferably substantially U-shaped in cross-section with the sides or legs 27, 28 extending axially and with the opening to the interior of the member directed towards the side flange 14 of the rim base so that the annular recess in the interior of the member 26 is in communication with the interior of a tire mounted upon the rim assembly.

In employing a sealing means of the type just mentioned, the means is placed between the ring member 17 and the rim member 11 prior to securing these parts together by means of the split rim 25. The initial positioning and retention of the member 26 in proper position may be facilitated by temporarily securing this member to the ring 17 as by means of cement or the like. After the sealing means is thus positioned between the rim and ring members and the parts are secured together by a locking ring 25, the previously existing gap or passage through which air could leak between the members 11 and 17 is now closed and is completely sealed when a tire mounted upon the rim is inflated since the pressure of the air contained in such a tire acts within the member 26 to force the sides or legs thereof into sealing engagement with the adjacent surfaces of the rim section and ring member. Inflation of such a tubeless tire and sealing of the conventional valve stem opening in the rim may be provided for by a valve structure of the type disclosed and claimed in my copending application, Serial No. 391,225, filed November 10, 1953, or by other suitable means.

In the preferred embodiment, the sealing member 26 has the outer surfaces of the sides 27 and 28 thereof provided with circumferentially extending spaced ridges or beads 29 between which are portions of lower elevation such as grooves 30, see Figs. 2 and 3. This configuration of the outer surfaces of the sides of the sealing member 26 decreases the area of contact of the latter with the adjacent members of the rim assembly relative to the inner area of the sealing member which is uniformly subjected to the force of the air contained in the tire. Consequently, the pressure of engagement of the ridges or beads 29 with the members 11 and 17 is greater than the pressure exerted on the interior of the sealing member by the air contained in the tire so that a highly effective seal is provided for the interior of the tire. Moreover, this increased pressure at the area of contact of the sealing member with the rim members 11 and 17 prevents the sealing member from being moved outwardly of the annular surface between the rim members. Hence, the bight 31 of the sealing member is not extruded between the flange 21 and the adjacent surface of the rim 11 even though the sealing member is not initially cemented to one of the members of the rim assembly. Moreover, although the sealing member has been illustrated as having the bight 31 thereof in engagement with the flange 21, it will be evident that the member may be disposed inwardly of this position, if desired, and will remain in such position after the tire is inflated.

The sealing means 26 is preferably formed by molding a continuous annulus of resilient rubber composition and in the molding one of the legs, such as 28, is preferably inclined at an angle relative to the plane of the inner surface of the other of the legs to insure proper engagement of the sides or legs 27, 28 with the adjacent surfaces of the rim assembly. In the illustrated embodiment this angularity is in the order of 20° but it will be understood that the angle is not critical and in some cases the sides or legs may be made substantially parallel. Preferably the length of the sides or legs 27, 28 is greater than the thickness of the member 26 to thereby provide for the aforementioned sealing action. However, in some instances effective sealing may be secured by a member 26 wherein the length of the sides or legs does not exceed the thickness of the member although, in such cases, there may be a tendency for a portion of the sealing member to be forced between the flange 21 of the member 17 and the adjacent surface of the member 11. In such a construction the sealing member should preferably be provided with a suitable lubrication to prevent adhesion of the member to the metal parts of the ring.

The improved sealing means of this invention may be provided with reinforcement to facilitate handling thereof and for other purposes. Such reinforcement may be effected by imbedding suitable strengthening members or materials in the member during the molding operation. Preferably, the reinforcement is in the form of a thin flexible metal band which is bonded to the inner surface of the side or leg of the member 26 which is to be thus strengthened. Reinforcing of this type is indicated for both legs of a sealing member 26' in Fig. 4 wherein the inner surfaces of the sides 27' and 28' of the member are each provided with an annular metal strip or band 32. The metal strips or bands 32 are preferably transversely slotted at circumferentially spaced locations as indicated at 33 in Fig. 5 to permit radial flexure of the sides or legs. While both sides or the legs of the member 26' have been shown as reinforced by metal bands 32, it will be evident that in some instances one only of the sides or legs may be thus reinforced or strengthened. It will also be apparent that reinforcing or strengthening of the sides or legs may also be provided by fabric or other suitable materials as will be understood by those familiar with the art of manufacturing and handling rubber articles.

The invention has been described and illustrated in detail with respect to the manner in which it is incorporated in one type of circumferentially divided rim assembly to effect sealing thereof. It will be apparent, however, that the improved sealing means may be employed in similar manner to effect sealing of circumferentially divided rim assemblies of other constructions and the invention is not limited to use of the sealing member with the specific rim base and removable bead ring illustrated. Also, while reference has been made to sealing the asssembly against passage of air it will be evident that the invention also effects sealing against other fluids which may be employed in a vehicle tire, such as water or other fluids which are frequently employed in tires for earth-moving equipment or the like. These and other adaptations and modifications will readily be apparent to those skilled in the art and hence the invention is not considered limited to the constructions shown and described except as may be required by the claims.

Having thus described the invention, I claim:

1. A self-sealing mounting for tubeless tires comprising a rim having a circumferential tire-supporting portion with an integral tire-retaining flange adjacent one side face thereof adapted to be engaged by one bead of a tire supported on the rim, a tire bead supporting ring member removably disposed on said rim and adapted to engage and support the other bead of a tire with an annular space between said rim and ring, means for retaining said ring on said rim, and an annular resilient air-sealing means disposed in said space and engaging said rim and ring, the said air-sealing means having an annular recess therein communicating with the interior of a tubeless tire mounted on said rim and ring, whereby the air pressure in said tire is applied interiorly of said member to force the latter into sealing engagement with said rim and ring.

2. A self-sealing mounting for a tubeless tire comprising a rim having a circumferential tire-supporting portion with an integral tire-retaining side flange adjacent one side face thereof adapted to be engaged by one bead of a tire supported on the rim, a tire bead supporting ring member removably positioned on said rim and adapted to engage and support the other bead of a tire with an annular space between said rim and ring, means for retaining said ring on said rim, and a resilient air-sealing means comprising an annular member substantially U-shape in cross-section disposed in said space with the interior of said member in communication with the interior of a tubeless tire mounted on said rim and ring, whereby the air pressure in said tire forces the sides of said member into fluid sealing engagement with said rim and ring.

3. A self-sealing mounting for a tubeless tire comprising a rim having a circumferential tire-supporting portion with an integral tire-retaining side flange adjacent one side face of the rim adapted to be engaged by one bead of a tire, a tire bead supporting ring member removably positioned on said rim and adapted to engage and support the other bead of a tire with an annular space between said rim and ring, means for retaining said ring on said rim, and a resilient air-sealing means comprising an annular member substantially U-shape in cross-section disposed in said space with the bight of said member directed outwardly and with the sides of said member engaging said rim and ring, the outer surfaces of the sides of said member being provided with a plurality of circumferentially extending ridges, whereby the air pressure in a tubeless tire mounted on said rim and ring forces said ridges into fluid sealing engagement with said rim and ring.

4. A self-sealing rim assembly for tubeless tires comprising a rim base having two peripheral surfaces of different diameters with an integral tire-retaining side flange extending generally radially outwardly adjacent the outer edge of the peripheral surface of greater diameter, a ring member having a protuberance on its inner surface adapted to surround the said rim base peripheral surface of lesser diameter with an annular space between the latter surface and the inner surface of the ring member, the said peripheral surface of greater diameter and the outer periphery of said ring member being adapted to engage and support a tubeless pneumatic tire, means to retain said ring member on said rim base, and an annular resilient rubber sealing member disposed in said annular space, the said sealing member having an annular recess therein communicating with the interior of a tubeless tire mounted on said rim base and ring member, whereby the said sealing member is forced into sealing engagement with said ring member and said rim base by the air pressure contained in a tubeless tire mounted on said rim assembly.

5. A self-sealing rim assembly for tubeless tires comprising a rim base having two peripheral surfaces of different diameters with an integral tire-retaining side flange extending generally radially outwardly adjacent the outer edge of the peripheral surface of greater diameter, a ring member having a protuberance on its inner surface adapted to surround the said rim base peripheral surface of lesser diameter with an annular space between the latter surface and the inner surface of the said ring member, the said peripheral surface of greater diameter and the outer periphery of said ring member being adapted to engage and support a tubeless pneumatic tire, means to retain said ring member on said rim base, and an annular resilient rubber sealing member disposed in said annular space, the said sealing member being substantially U-shape in cross-section and positioned with the interior thereof in communication with the interior of a tubeless tire mounted on said rim base and ring member, whereby the sides of said member are forced into sealing engagement with said rim base and ring member by the air pressure in said tire.

6. The assembly as defined in claim 5 wherein the outer surfaces of the sides of said sealing member are provided with a plurality of spaced circumferentially extending ridges whereby the pressure of contact of said sealing member with said rim base and ring member is greater than the pressure of the air contained in a tire mounted on the assembly.

7. A circumferentially divided rim assembly for a tubeless inflatable tire comprising a base member, at least one removable ring member provided with a tire retaining flange and removably positioned on said base member with an annular space between the said members, means for retaining the said ring member on the base member, and a resilient annular sealing member substantially U-shaped in cross section disposed in the said space between the ring and base members with the interior of said sealing member in communication with the interior of a tubeless tire mounted on said assembly so that the pressure of the fluid in the tire forces the said sealing member into fluid sealing engagement with said base and ring members.

8. A rim assembly as defined in claim 7 in which the lengths of the sides of said sealing member are greater than the thickness of the sealing member.

9. A circumferentially divided rim assembly for a tubeless inflatable tire comprising a base member, at least one removable ring member provided with a tire retaining flange and removably positioned on said base member with an annular space between the same members, means for retaining the said ring member on the base member, and a reinforced resilient annular sealing member substantially U-shaped in cross section disposed in the said space between the ring and base members, the external surfaces of the sides of said sealing member having circumferentially extending ridges and the interior of said sealing member being in communication with the interior of a tubeless tire mounted on said assembly whereby the pressure of the fluid in the tire forces said sealing member into fluid sealing engagement with said base and ring members.

References Cited in the file of this patent

UNITED STATES PATENTS

| | | |
|---|---|---|
| 1,132,898 | Austin | Mar. 23, 1915 |
| 2,468,947 | Sinclair | May 3, 1949 |
| 2,518,829 | Smith | Aug. 15, 1950 |
| 2,538,198 | Hosford | Jan. 16, 1951 |
| 2,685,907 | Waddell | Aug. 10, 1954 |

FOREIGN PATENTS

| | | |
|---|---|---|
| 25,769 | Great Britain | 1911 |
| 881,431 | France | Jan. 22, 1943 |